United States Patent [19]

Furukawa et al.

[11] 3,920,596

[45] Nov. 18, 1975

[54] SIZING AGENT FOR GLASS FIBERS

[75] Inventors: Jun-ichi Furukawa; Yoshinao Kono, both of Wakayama, Japan

[73] Assignee: Kao Soap Co., Ltd., Tokyo, Japan

[22] Filed: June 12, 1974

[21] Appl. No.: 478,441

[30] Foreign Application Priority Data
June 27, 1973 Japan.................................. 48-72520

[52] U.S. Cl....260/22 R; 117/126 GB; 260/29.2 UA; 260/29.6 MM; 260/DIG. 16
[51] Int. Cl.²................... C08L 67/08; C08L 67/06
[58] Field of Search.........260/29.2 UA, 29.6 MM, 260/29.6 MQ, DIG. 15, DIG. 16, 22R; 117/126 GQ, 126 GB

[56] References Cited
UNITED STATES PATENTS

| | | | |
|---|---|---|---|
| 2,801,189 | 7/1957 | Collier | 117/126 GQ |
| 2,855,373 | 10/1958 | Guenther | 260/842 |
| 3,063,870 | 11/1962 | Wakeman | 260/29.2 UA |
| 3,097,963 | 7/1963 | Caroselli | 260/22 R |
| 3,214,491 | 10/1965 | Stanton | 260/871 |
| 3,345,339 | 10/1967 | Parker | 260/75 |
| 3,442,842 | 5/1969 | Von Bonin | 260/29.2 |

*Primary Examiner*—Paul R. Michl
*Attorney, Agent, or Firm*—Woodhams, Blanchard and Flynn

[57] ABSTRACT

A sizing agent composition comprising a film-forming material, a lubricant for glass fibers, a coupling agent and an antistatic agent, in which the film-forming material is an oil-in-water type emulsion of an unsaturated polyester obtained by reacting under heating (a) 1 mole of a dibasic acid component containing at least 50 mole percent of fumaric acid or maleic anhydride and (b) 1 to 1.5 moles of a diol component containing at least 30 mole percent of an adduct of 2 to 10 moles of an alkylene oxide to bisphenol A, with (c) an emulsifier selected from an adduct of 5 to 200 moles of an alkylene oxide to castor oil, an adduct of 5 to 200 moles of an alkylene oxide to hydrogenated castor oil and a polyethyleneglycol having an average molecular weight of 1000 to 6000, the amount of said emulsifier (c) being 5 to 30 parts by weight per 100 parts by weight of the sum of the polyester starting materials (a) and (b), and incorporating the resulting unsaturated polyester into water, and that the antistatic agent is a triethanolamine salt of an oxyacid of a metal selected from the group consisting of titanium, antimony, molybdenum, vanadium, aluminum, zinc, tin, germanium, zirconium, tungsten, boron and tellurium.

7 Claims, No Drawings

SIZING AGENT FOR GLASS FIBERS

BACKGROUND OF THE INVENTION

1. Field of the Invention

This invention relates to a sizing agent composition for glass fibers and articles of manufacture comprising glass fibers. More particularly, the invention relates to a sizing agent composition for glass fibers which improves the surface characteristics of glass fibers and articles comprising glass fibers and imparts an excellent transparency to glass fiber-reinforced articles and the like.

In greater detail, the sizing agent composition, according to this invention, is characterized by the features that a self-emulsifiable unsaturated polyester of the bisphenol type is used as a film-forming material and that a triethanolamine salt of an oxyacid of a metal selected from titanium, antimony, molybdenum, vanadium, aluminum, zinc, tin, germanium, zirconium, tungsten, boron and tellurium is used as an antistatic agent.

2. Description of the Prior Art

Various surface treatments have heretofore been applied to inorganic materials for promoting the bonding of inorganic materials and organic materials. Especially, in the art of glass fibers, sizing agents have been playing an important role in preparing fiber-reinforced plastics, sometimes hereafter referred to as FRP, composed of glass fibers and thermosetting resins. When glass fibers are used as a reinforcement for FRP, they are employed in the form of a mat or in the form of separate short staple fibers. Because glass fibers tend to be statically charged, it is frequently desirable, and is indispensable in some cases, to use an antistatic agent during the manufacturing or cutting steps. If an antistatic agent is employed, it is possible to distribute the glass fibers uniformly in the lamination or molding composition. However, if the antistatic agent is not correctly chosen, the fibers are caused to repel from one another by static charges and a non-uniform distribution of glass fibers occurs in the composition.

Sizing of glass fibers or filaments is generally accomplished by applying a coating composition to fiber surfaces just after extrusion and before cutting the filaments into staples. Coating compositions heretofore used for this purpose comprise, in general, (1) a film-forming material, (2) a lubricant for glass fibers and (3) an antistatic agent. When the glass fibers are to be bonded to resins, in order to improve the bonding between the glass fibers and the resin, a coupling agent is usually incorporated into such sizing agent composition. When the glass fibers are to be used as a reinforcement for resins, the sizing agent composition should have a good compatibility with the resins.

Satisfactory antistatic agents should have not only a property of preventing generation of static charges but also a good compatibility with other components of the sizing agent. It is also required that they should not impair the desired good transparency of the final resin products containing the glass fibers.

Such agents as alkyl amines, quaternary ammonium salts, polyoxyethylene alkyl amines and ampholytic surface active agents of the betaine type have generally been used as antistatic agents for glass fibers.

These prior art antistatic active agents, however, have a very low effect when applied with self-emulsifiable polyesters of the bisphenol type which are used in the compositions of the present invention. Inorganic salt antistatic agents, which have heretofore been used, such as potassium chloride, lithium chloride, ammonium chloride and the like, have a high antistatic effect, but the are defective in that they reduce greatly the transparency of glass fiber-reinforced resin articles.

It is therefore a primary object of this invention to provide a sizing agent composition for glass fibers comprising an improved antistatic agent in combination with a self-emulsifiable polyester of the bisphenol type.

Another object of this invention is to provide glass fibers coated by means of and with such improved sizing agent composition.

Still another object of this invention is to provide a sizing agent composition for glass fibers which can impart a better transparency to glass fiber-reinforced resin articles than conventional sizing agents.

SUMMARY OF THE INVENTION

These objects of this invention are attained by employing a sizing agent composition for glass fibers comprising a film-forming material, a known lubricant for glass fibers, a known coupling agent and an antistatic agent, characterized in that the film-forming mateial is an oil-in-water type emulsion of an unsaturated polyester obtained by reacting under heating (a) 1 mole of a dibasic acid component containing at least 50 mole percent of fumaric acid or maleic anhydride and (b) 1 to 1.5 moles of a diol component containing at least 30 mole percent of an adduct of 2 to 10 moles of an alkylene oxide to bisphenol A, with (c) an emulsifier selected from an adduct of 5 to 200 moles of an alkylene oxide to castor oil, an adduct of 5 to 200 moles of an alkylene oxide to hydrogenated castor oil and a polyethyleneglycol having an average molecular weight of 1000 to 6000, the amount of said emulsifier (c) being 5 to 30 parts by weight per 100 parts by weight of the sum of the polyester starting materials (a) and (b), and incorporating the resulting unsaturated polyester into water, and further characterized in that the antistatic agent is a triethanolamine salt of an oxyacid of a metal selected from the group consisting of titanium, antimony, molybdenum, vanadium, aluminum, zinc, tin, germanium, zirconium, tungsten, boron and tellurium.

Still another object of this invention is to provide improved glass fibers and improved glass fiber-reinforced resin articles by employing glass fibers coated with the above-mentioned sizing agent.

The self-emulsifiable unsaturated polyester of the bisphenol type employed in this invention is formed by employing as a critical glycol component an alkylene oxide adduct to bisphenol A (the number of added moles of alkylene oxide being 2 to 10) and reacting the resulting adduct with an unsaturated dicarboxylic acid. It is possible to obtain unsaturated polyesters differing in properties, namely polyesters ranging from highly viscous liquids to solids having a softening point of 95°C., if the mixing ratio of (b) the alkylene oxide adduct to bisphenol A to (a) the dicarboxylic acid is changed optionally within the above range. In preparing the above unsaturated resin, an emulsifier selected from the group consisting of polyalkyleneglycols having an average molecular weight of 1000 to 6000 and adducts of a plurality of moles (5 to 200 moles) of an alkylene oxide adducted to castor oil or hydrogenated castor oil is added and allowed to participate in the reaction, whereby a self-emulsifiable polyester is obtained.

In order to attain one of the objects of this invention, namely the object of obtaining glass fiber-reinforced resin articles having an excellent transparency, it is indispensable that the above described unsaturated polyester resin should exhibit a substantial penetrating power to vinyl monomers. In other words, it is indispensable that the glass fibers should be made so highly and uniformly penetrative that when the glass fibers are incorporated in a resin matrix, the glass fibers should not be readily visually distinguishable from the resin matrix as a whole and it should be difficult to observe with the naked eye that the resin matrix is reinforced by glass fibers. In the art it is well known that it is very difficult to obtain glass fiber-reinforced resin articles in which the glass fibers are not visible or are inconspicuous. It is considered that the conspicuousness of glass fibers in comparison with the resin matrix is owing to the extreme discoloration of treated fibers as compared with the color of the resin matrix and to the physical properties (for example, refractive index and the like) of the fibers present on the resin surface.

Most glass fiber-reinforced resin articles are not colored with a pigment. Accordingly, the undesired conspicuousness of glass fiber in comparison with the resin matrix has been a problem in the past. An unsaturated polyester obtained by reacting an alkylene oxide adduct to bisphenol A (the number of added moles of alkylene oxide being 2 to 10) as an indispensable diol component, with an unsaturated dicarboxylic acid optionally containing a saturated dicarboxylic acid, and a polyalkyleneglycol or alkylene oxide adduct to castor oil or hydrogenated castor oil as an emulsifier, exhibits a substantial solubility to vinyl monomers.

The self-emulsifiable unsaturated polyester resin according to this invention can be obtained by mixing (a) 1 mole of a dibasic acid component containing at least 50 mole percent of a material selected from the group consisting of fumaric acid, maleic anhydride and mixtures thereof and (b) 1 to 1.5 moles of a diol component containing at least 30 mole percent of an adduct of 2 to 10 moles of an alkylene oxide (e.g. ethylene oxide, propylene oxide and the like) to bisphenol A, with (c) 5 to 30 parts by weight, per 100 parts by weight of the sum of the polyester starting materials (a) and (b), of an emulsifier selected from the group consisting of an adduct of 5 to 200 moles of the alkylene oxide to castor oil, an adduct of 5 to 200 moles of the alkylene oxide to hydrogenated castor oil and a polyalkyleneglycol, e.g., polyethyleneglycol, having an average molecular weight in the range of 1000 to 6000 and heating the mixture to effect esterification.

The oil-in-water type emulsion of an unsaturated polyester to be used in this invention is prepared in the following manner.

First, according to a conventional method, reactants (a), (b) and (c) are heated and reacted while removing water formed by the polycondensation reaction. The reaction is carried out at a temperature of 150° to 210°C., preferably at 170° to 200°C. The reaction is stopped when the acid value of the reaction mixture becomes lower than 30. Then, the resulting polyester is cooled to 100° to 150°C. and is gradually added with sufficient agitation to water maintained at 60° to 95°C., whereby the polyester is completely emulsified and an oil-in-water type emulsion of an unsaturated polyester is obtained.

It is critical that the unsaturated dibasic acid component (a) used for making the unsaturated polyester consists of 50 to 100 mole percent of fumaric acid, maleic anhydride or mixtures thereof. The balance of the dibasic acid component, that is, up to 50 mole percent thereof, can be selected from other $\alpha,\beta$-ethylenically unsaturated dibasic acids such as maleic acid and itaconic acid. It is industrially advantageous to employ a dibasic acid component consisting essentially of 100 mole percent of fumaric acid, maleic anhydride or mixtures thereof.

It is permissible to employ, as an optional additive, a small amount of up to 1 moles per 1 mole of said dibasic acid component (a), of a saturated dibasic acid such as tetrahydrophthalic anhydride, phthalic anhydride, isophthalic acid, adipic acid and succinic acid in combination with said unsaturated dibasic acid component (a) fumaric acid or maleic anhydride.

It is critical to use as the diol component (b) of the polyester reaction mixture, a diol component consisting of 30 to 100 mole percent of an alkylene oxide adduct to bisphenol A. This adduct is formed by adding 2 to 10 moles of an alkylene oxide to 1 mole of bisphenol A (2,2-bis(4-hydroxyphenylpropane)). As the alkylene oxide, there can be used, for example, ethylene oxide and propylene oxide. The balance of the diol component, that is, up to 70 mole percent thereof, can be (1) hydrogenated bisphenol A, or (2) a diol of the following formula

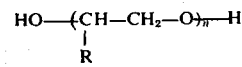

wherein $n$ is an integer of from 1 to 4 and R is H or $CH_3$, or (3) mixtures of (1) and (2).

A diol of the above formula, hydrogenated bisphenol and mixtures thereof can be used in combination with the essential constituent, the alkylene oxide adduct to bisphenol A. Specific examples of such diol of the above formula are ethyleneglycol, propyleneglycol, diethyleneglycol, triethyleneglycol, tetraethyleneglycol, dipropyleneglycol, tripropyleneglycol and tetrapropyleneglycol.

As the emulsifier (c), there can be used alkylene oxide adduct to castor oil or hydrogenated castor oil, formed by reactively adding 5 to 200 moles, preferably 50 to 150 moles, of an alkylene oxide such as ethylene oxide or propylene oxide to castor oil or hydrogenated castor oil. Ethylene oxide is generally employed as the alkylene oxide. Another emulsifier that can be used is a polyalkylene glycol such as a polyethyleneglycol having an average molecular weight in the range of 1000 to 6000. Mixtures of these emulsifiers (c) can be used.

The unsaturated polyester according to this invention is prepared by reacting 1 to 1.5 moles of the diol component, as defined above with 1 mole of the dibasic acid component, as defined above. This reaction is carried out in the presence of the emulsifier.

The amount of the emulsifier (c), as defined above, used for preparing an unsaturated polyester is from 5 to 30 parts by weight of emulsifier per 100 parts by weight of the sum of the above defined dibasic acid component [the above component (a)] plus the diol component [the above component (b)]. It is possible to add minor amounts of polymerization initiator, defoaming agent and the like to the reaction mixture according to need, in a conventional manner.

The antistatic agent used in this invention is a triethanolamine salt of a metal oxyacid. As preferred metal components of said salts, there are, for example, titanium, antimony, molybdenum, vanadium, aluminum, zinc, tin, germanium, zirconium, tungsten, boron and tellurium. The agents are thus the triethanolamine salts of the oxyacids of these metal elements and include the triethanolamine titanate, the antimonate, the molybdate, the vanadate, the aluminate, the zincate, the stannate, the germaniate, the zirconate, the tungstate, the borate, and the tellurate.

In the sizing agent composition for glass fibers according to this invention, it is preferred that the antistatic agent is incorporated in an amount of 1 to 10 parts by weight per 100 parts by weight of the film-forming material, calculated on a water-free basis.

Effective lubricants for use in the sizing agent composition for glass fibers according to this invention are those well known in the art of glass fiber fabrication processes and this invention does not relate to any discovery relating thereto. For example, there can be employed lubricants such as oils, fats and waxes of animal, vegetable and marine or synthetic origin such as carnauba oil and candelilla wax, silicone oils such as dihydrocarbon polysiloxane, glycerin, polyethyleneglycol, polyhydric alcohol esters such as esters of diethyleneglycol and tetraethyleneglycol, fatty alcohols such as lauryl alcohol and stearyl alcohol, pelargone amide, and fatty acid amines such as a polyvalent unsaturated fatty acid amide solubilized by an acid anhydride. In the sizing agent composition of this invention, it is preferred to use the lubricant in an amount of 10 to 30 parts by weight per 100 parts by weight (water-free basis) of the unsaturated polyester of the bisphenol type used as the film-forming material.

Effective coupling agents for use in the sizing agent composition for glass fibers according to this invention also are well known in the art of glass fiber fabrication, and the invention does not relate to any discovery pertaining thereto. As the coupling agent, there can be used, for example, silanes such as vinyl triethoxysilane, vinyl triacetoxysilane, allyl trichlorosilane, aminosilane, epoxysilane and γ-methacryloxypropyl trimethoxysilane, and siloxanes such as vinyl trisiloxane and allyl polysiloxane. In the sizing agent composition of this invention it is preferred that the coupling agent is incorporated in an amount of 5 to 50 parts by weight per 100 parts by weight (water-free basis) of the unsaturated polyester of the bisphenol type used as the film-forming material.

The sizing agent composition according to this invention is applied to the glass fibers in the form of an aqueous solution or emulsion thereof. Such solution or emulsion generally contains from 0.5 to 5 weight percent of the sizing agent composition according to the invention, and the balance is water. The sizing agent composition is applied in any conventional manner such as by spraying it onto the glass fibers or immersing the glass fibers therein. The thus-coated glass fibers are then dried, for example in an over or in ambient air, to remove the water, whereby the glass fibers are uniformly coated by the coating agent composition. It is effective to apply the sizing agent composition so that the glass fibers are coated with from 0.5 to 2 weight percent of the sizing agent composition, calculated on a water-free basis, based on the weight of the glass fibers.

This invention will now be further described by reference to the following illustrative Examples.

EXAMPLE 1

A reaction vessel equipped with an agitator, a thermometer, a nitrogen gas introduction tube and a water-removing tube was charged with 1050 g (3.0 moles) of 2.0 prodendro-bisphenol (adduct of 2.0 moles of propylene oxide to bisphenol A), 323 g (2.8 moles) of fumaric acid, 343 g of polyethyleneglycol number 1500 (having an average molecular weight of about 1500), 1.0 g of hydroquinone and 0.3 g of silicone (marketed under the tradename "Toshiba Silicone TSA-730") as a defoaming agent, and the mixture was heated and reacted at 160° to 210°C. in a nitrogen gas current. The reaction was stopped when the acid value of the formed polyester was 25. The reaction product was cooled to 100°C. and then was gradually poured with agitation into water maintained at 70° to 80°C. to obtain a homogeneous unsaturated polyester emulsion. The water content of the thus-obtained oil-in-water type unsaturated polyester emulsion was adjusted so that the polyester concentration was 30 percent by weight.

Using the above emulsion, a sizing composition of the following recipe was prepared by mixing:

| Material | % by weight |
| --- | --- |
| polyester emulsion (30 wt.% polyester) | 3.00 |
| γ-methacryloxypropyl trimethoxysilane (manufactured by UCC) | 0.18 |
| fatty acid amide, Cirrsol 185 A (manufactured by ICI) | 0.08 |
| triethanolamine titanate | 0.10 |
| formic acid | 0.04 |
| water | balance |
| total | 100.00 |

The pH of the above sizing composition was 4.2.

A satin weave glass cloth was dipped in this emulsion, and then the cloth was air-dried and heated at 120°C. for 1 hour to age the sizing agent. Prior to this sizing treatment, the cloth was sufficiently washed and cut into a size of 20 cm × 20 cm. The thus-coated square glass cloth was allowed to stand still overnight under the conditions of a temperature of 25°C. and a relative humidity of 60 percent. Then, the surface resistivity of the cloth was measured by a high resistance meter manufactured by Yokokawa Denki. The amount of the sizing composition applied to the glass cloth was 0.81 wt. percent.

Using the thus-obtained coated cloth, a 5-layer laminate of a glass cloth-reinforced polyester resin (the glass content being 25 to 30 percent) was prepared. The resin used was Epolac N-350L (isophthalate type) manufactured by Nippon Shokubai. Cobalt naphthenate and methylethylketone peroxide were used as a curing promotor and a curing catalyst, respectively, and the room temperature curing time was adjusted to from 20 to 30 minutes.

The laminate was subjected to a post-curing treatment for 1 hour at 110° to 120°C., and after the laminate was cooled, samples having a size of 5 cm × 5 cm were cut from the laminate. Using such test samples, the light transmission was measured by means of a haze meter manufactured by Toyo Rikakogyo, and the transparency was evaluated.

For comparison, in the same manner as described above, a sizing composition was prepared by employing a vinyl acetate copolymer, which is conventionally employed as a film-forming material for glass fibers, and lauryl trimethyl ammonium chloride, which is one of the quaternary ammonium salts customarily used as antistatic agents in this field, and a glass cloth was treated with this comparative sizing composition. The surface resistivity of the resulting glass cloth and the transparency of the laminate were determined in the same manner as described above.

Results of the above measurements are as follows:

|  | Surface Resistivity | Transparency |
|---|---|---|
| product of this invention | $5.9 \times 10^{10}$ Ωcm | 143 |
| comparative product | $4.8 \times 10^{10}$ Ωcm | 100 |

Note
The transparency is expressed in terms of the light transmission measured according to the above method and is a relative value based on the light transmission (assigned the arbitrary value of 100) of the comparative product.

From the above results, it will readily be understood that the sizing agent compositions of this invention have a sufficiently high antistatic effect and give a laminate having a much higher transparency than that of a laminate treated with the conventional sizing agent composition (comparative product).

EXAMPLE 2

The same reaction vessel as used in Example 1 was charged with 1037 g (3.2 moles) of an adduct of 2 moles of ethylene oxide to bisphenol A, 294 g (3.0 moles) of maleic anhydride, 330 g of an adduct of 100 moles of ethylene oxide to castor oil, 1.0 g of hydroquinone and 0.3 g of silicone (marketed under the tradename "Toshiba Silicone TSA-730") as a defoaming agent, and the mixture was heated and reacted at 160° to 210°C in a nitrogen gas current. A reaction product having an acid value of 25 was obtained by conducting the reaction for about 6 hours. Then, the product was cooled to 100°C. and was gradually poured under agitation into water maintained at 70° to 80°C. to obtain a homogeneous emulsion. The thus-obtained oil-in-water type unsaturated polyester emulsion was so adjusted that the polyester concentration was 30 percent by weight.

Using the thus-obtained emulsion, a sizing agent composition of the following recipe was prepared by mixing:

| Material | % by weight |
|---|---|
| polyester emulsion (30 wt.% polyester) | 3.00 |
| γ-methacryloxypropyl trimethoxysilane (product of UCC) | 0.20 |
| fatty acid amide, Cirrasol 220 (product of ICI) | 0.08 |
| triethanolamine aluminate | 0.12 |
| formic acid | 0.05 |
| water | balance |
| total | 100.00 |

The pH of the above sizing composition was 4.4.

In the same manner as in Example 1, a glass cloth was treated with the thus-formed sizing agent composition and dried. The surface resistivity of the treated glass cloth and the transparency of a laminate prepared in the same manner as in Example 1 from this glass sheet were determined. The amount of the sizing composition applied to the glass cloth was 0.75 wt. percent.

Results of the measurements are as follows:

| Surface Resistivity | Transparency |
|---|---|
| $5.1 \times 10^{10}$ Ωcm | 132 (same basis as in Example 1) |

From the results shown above, it will readily be understood that as compared with the comparative product used in Example 1, the sizing agent of this invention has a sufficiently high antistatic effect and gives a laminate excellent in the transparency.

EXAMPLE 3

The same reaction vessel as used in Example 1 was charged with 566.9 g (1.6 moles) of an adduct of 2 moles of propylene oxide to bisphenol A, 580 g (2.8 moles) of hydrogenated bisphenol, 488 g (4.2 moles) of fumaric acid, 340 g of polyethyleneglycol having an average molecular weight of 4000, 1.5 g of hydroquinone and 0.5 g of silicone (marketed under the tradename "Toshiba Silicone TSA-730"), and the mixture was heated and reacted at 160° to 210°C. in a nitrogen current. A reaction product having an acid value of 29 and a softening point of 90°C. was obtained by conducting the reaction for about 10 hours. The reaction product was cooled to 140°C. and was gradually poured with agitation in hot water maintained at 90 to 95°C. to obtain a homogeneous unsaturated polyester emulsion. The thus-obtained oil-in-water type unsaturated polyester emulsion was so adjusted that the polyester concentration was 30 percent by weight.

Using the thus-prepared emulsion, a sizing agent composition composed of the following materials was prepared by mixing:

| Materials | % by weight |
|---|---|
| polyester emulsion (30 wt.% polyester) | 3.00 |
| vinyl triethoxysilane (product of UCC) | 0.20 |
| fatty acid amide, Cirrasol GY (product of ICI) | 0.08 |
| triethanolamine antimonate | 0.12 |
| acetic acid | 0.05 |
| water | balance |
| total | 100.00 |

The pH of the above sizing composition was 4.1.

A glass sheet was treated with the above sizing composition and dried in the same manner as described in Example 1. The surface resistivity of the treated glass cloth and the transparency of a laminate prepared from the treated glass sheet were measured in the same manner as described in Example 1 to obtain the following results:

| Surface Resistivity | Transparency |
|---|---|
| $6.1 \times 10^{10}$ Ωcm | 134 (same basis as Example 1) |

The amount of the sizing composition applied to the glass cloth was 0.77 wt. percent.

From the above results, it will readily be understood that as compared with the comparative product used in Example 1, the sizing agent of this invention has a sufficiently high antistatic effect and gives a laminate of highly excellent transparency.

EXAMPLE 4

The same reaction vessel as used in Example 1 was charged with 1128 g (3.2 moles) of an adduct of 2 moles of propylene oxide to bisphenol A, 76.1 g (1.0 mole) of propyleneglycol, 314 g (3.2 moles) of maleic anhydride, 120 g (0.8 mole) of phthalic anhydride, 430 g of an adduct of 100 moles of ethylene oxide to hydrogenated castor oil, 1.6 g of hydroquinone and 0.7 g of silicone (marketed under the tradename "Toshiba Silicone TSA-730"), and the mixture was heated and reacted at 160° to 210°C. in a nitrogen current. A reaction product having an acid value of 24 was obtained by conducting the reaction for about 11 hours. The reaction product was cooled to 100°C. and was gradually poured with agitation into water maintained at 70° to 80°C. to obtain a homogeneous unsaturated polyester emulsion. The resulting oil-in-water type unsaturated polyester emulsion was adjusted so that the polyester concentration was 30 percent by weight.

Using the thus-obtained emulsion, a sizing agent composition composed of the following materials was prepared by mixing:

| Materials | % by weight |
|---|---|
| polyester emulsion (30 %wt.% polyester) | 3.00 |
| vinyl tris-(β-methoxyethoxy) silane (product of UCC) | 0.20 |
| fatty acid amide, Cirrasol FG (product of ICI) | 0.08 |
| triethanolamine titanate | 0.13 |
| acetic acid | 0.05 |
| water | balance |
| total | 100.00 |

The pH of the above sizing composition was 4.5.

A glass cloth was treated with the above sizing agent composition and dried in the same manner as described in Example 1. The surface resistivity of the treated cloth and the transparency of a laminate prepared from the treated glass cloth were determined in the same manner as described in Example 1 to obtain the following results.

| Surface Resistivity | Transparency |
|---|---|
| $4.9 \times 10^{10}$ Ωcm | 128 (same basis as Example 1) |

The amount of the sizing composition applied to the glass cloth was 0.79 percent.

From the results shown above, it will readily be understood that as compared with the comparative product used in Example 1, the sizing agent of this invention has a sufficiently high antistatic effect and gives a laminate of highly excellent transparency.

The embodiments of the invention in which an exclusive property or privilege is claimed are defined as follows:

1. In a sizing agent composition for glass fibers comprising a film-forming material, a lubricant for glass fibers, a coupling agent for glass fibers and an antistatic agent, the improvement which comprises employing as the film-forming material an oil-in-water type emulsion of an unsaturated polyester obtained by the reaction of (a) 1 mole of a dibasic acid component containing at least 50 mole percent of a material selected from the group consisting of fumaric acid, maleic anhydride and mixtures thereof, (b) 1 to 1.5 moles of a diol component containing at least 30 mole percent of an adduct of 2 to 10 moles of an alkylene oxide to bisphenol A, with (c) an emulsifier selected from the group consisting of an adduct of 5 to 200 moles of an alkylene oxide to castor oil, an adduct of 5 to 200 moles of an alkylene oxide to hydrogenated castor oil and polyethylene glycol having an average molecular weight of 1000 to 6000, the amount of said emulsifier (c) being 5 to 30 parts by weight per 100 parts by weight of the sum of the polyester starting materials (a) and (b), and incorporating the resulting unsaturated polyester into water together with an antistatic agent, said antistatic agent being a triethanolamine salt of an oxyacid of a metal selected from the group consisting of titanium, antimony, molybdenum, vanadium, aluminum, zinc, tin, germanium, zirconium, tungsten, boron and tellurium, the composition containing from 1 to 10 parts by weight of said antistatic agent per 100 parts by weight of said emulsion, calculated as the solids.

2. A composition according to claim 1, in which said emulsion is obtained by reacting at a temperature of 150° to 210°C, a reaction mixture consisting of components (a), (b), (c) and (d) wherein the mole ratio of $$\frac{(b)}{(a)}$$

is $$\frac{1.0 \text{ to } 1.5}{1.0}$$

and the weight ratio of $$\frac{(c)}{(a) \text{ plus } (b)}$$

is $$\frac{5 \text{ to } 30}{10.0},$$

wherein component (a) consists of
1. 50 to 100 mole percent of a material selected from the group consisting of fumaric acid, maleic anhydride and mixtures thereof, and
2. the balance of (a) is α,β-ethylenically unsaturated dibasic acid component (b) consists of
1. 30 to 100 mole percent of an adduct of 2 to 10 moles of alkylene oxide to bisphenol A, and
2. the balance is selected from the group consisting of hydrogenated bisphenol A, diol of the formula

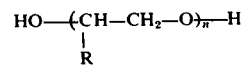

wherein n is an integer from 1 to 4 and R is H or CH$_3$,
and mixtures thereof,
component (c) is selected from the group consisting of an adduct of 5 to 200 moles of an alkylene oxide to castor oil, an adduct of 5 to 200 moles of an alkylene oxide to hydrogenated castor oil and polyethylene glycol having an average molecular weight of 1000 to 6000, and component (d) is up to 1 moles, per one mole of said component (a) (1) of a material selected from the group consisting of tetrahydrophthalic anhydride, phthalic anhydride, isophthalic acid, adipic acid, succinic acid and mixtures thereof
the reaction being carried out until the acid value of the reaction mixture is less than 30 and then adding the reaction mixture to water at 60° to 95°C.

3. A method according to claim 2, wherein said alkylene oxide is ethylene oxide or propylene oxide.

4. A method according to claim 3, wherein component (a) consists of fumaric acid.

5. A method according to calim 3, wherein component (a) consists of maleic anhydride.

6. A coated product comprising glass fibers or mats of glass fibers coated with from 0.5 to 5 weight percent of a composition according to claim 1, based on the weight of the glass fibers.

7. A method of sizing glass fibers or mats of glass fibers which comprises applying an aqueous solution or emulsion of the composition defined in claim 1 to the glass fibers and then evaporating water from the composition to deposit a coating on said glass fibers.

* * * * *

UNITED STATES PATENT OFFICE
CERTIFICATE OF CORRECTION

Patent No. 3,920,596　　　　　　　　Dated November 18, 1975

Inventor(s) Jun-ichi Furukawa and Yoshinao Kono

It is certified that error appears in the above-identified patent and that said Letters Patent are hereby corrected as shown below:

Col. 10, line 43; change " $\frac{5 \text{ to } 30}{10.0}$ " to --- $\frac{5 \text{ to } 30}{100}$ ---.

Signed and Sealed this thirteenth Day of April 1976

[SEAL]

Attest:

RUTH C. MASON  
Attesting Officer

C. MARSHALL DANN  
Commissioner of Patents and Trademarks